United States Patent
Zimmer et al.

(10) Patent No.: US 7,660,913 B2
(45) Date of Patent: Feb. 9, 2010

(54) OUT-OF-BAND PLATFORM RECOVERY

(75) Inventors: Vincent J. Zimmer, Federal Way, WA (US); Michael A. Rothman, Puyallup, WA (US)

(73) Assignee: Intel Corporation, Santa Clara, CA (US)

( * ) Notice: Subject to any disclaimer, the term of this patent is extended or adjusted under 35 U.S.C. 154(b) by 435 days.

(21) Appl. No.: 11/110,504

(22) Filed: Apr. 20, 2005

(65) Prior Publication Data

US 2006/0242280 A1  Oct. 26, 2006

(51) Int. Cl.
| | |
|---|---|
| G06F 3/00 | (2006.01) |
| G06F 9/00 | (2006.01) |
| G06F 9/24 | (2006.01) |
| G06F 15/177 | (2006.01) |
| G06F 1/24 | (2006.01) |
| G06F 11/00 | (2006.01) |
| G06K 5/04 | (2006.01) |

(52) U.S. Cl. .............................. 710/6; 709/222; 713/1; 713/2; 713/100; 714/100; 714/699

(58) Field of Classification Search .................. 710/222
See application file for complete search history.

(56) References Cited

U.S. PATENT DOCUMENTS

| | | |
|---|---|---|
| 5,230,052 A | 7/1993 | Dayan et al. |
| 5,349,640 A | 9/1994 | Dunn |
| 5,978,912 A | 11/1999 | Rakavy et al. |
| 6,324,644 B1 | 11/2001 | Rakavy et al. |
| 6,421,777 B1 | 7/2002 | Pierre-Louis et al. |
| 6,438,688 B1 | 8/2002 | Nunn |
| 6,594,757 B1 | 7/2003 | Martinez |
| 6,715,074 B1 | 3/2004 | Chaiken |
| 6,732,267 B1 | 5/2004 | Wu et al. |
| 2002/0178242 A1 | 11/2002 | Eda |
| 2003/0131291 A1* | 7/2003 | Morrison et al. ............... 714/54 |
| 2004/0268106 A1 | 12/2004 | Holmberg |
| 2005/0038808 A1* | 2/2005 | Kutch .......................... 707/102 |
| 2005/0108513 A1 | 5/2005 | Lam |
| 2006/0020837 A1* | 1/2006 | Rothman et al. ............. 713/310 |
| 2006/0136703 A1* | 6/2006 | Wisecup et al. ................. 713/2 |
| 2006/0136704 A1* | 6/2006 | Arendt et al. ................... 713/2 |
| 2006/0184349 A1* | 8/2006 | Goud et al. .................... 703/24 |
| 2006/0218604 A1* | 9/2006 | Riedl et al. ..................... 725/91 |

OTHER PUBLICATIONS

"Extensible Firmware Interface", Microsoft, Jan. 21, 2005, http://technet2.microsoft.com/windowsserver/en/library/6b03fad7-665e-49f3-8e7d-e1a6a5be9cf01033.mspx?pf=true.*

* cited by examiner

*Primary Examiner*—Henry W. H. Tsai
*Assistant Examiner*—Kris Rhu
(74) *Attorney, Agent, or Firm*—Blakely, Sokoloff, Taylor & Zafman LLP

(57) ABSTRACT

The present disclosure relates to attempting to initialize and configure a device utilizing a remote server and, more specifically, to attempting to initialize a device with low level device configuration information that is stored on a remote server or servers.

22 Claims, 3 Drawing Sheets

OUT-OF-BAND PLATFORM RECOVERY

BACKGROUND

1. Field

The present disclosure relates to attempting to initialize and configure a device utilizing a remote server and, more specifically, to attempting to initialize a device with low level device configuration information that is stored on a remote server or servers.

2. Background Information

In this context, the Basic Input-Output System (BIOS) is typically computer interface code that, among other tasks, locates and loads the operating system into memory. It often provides low-level communication, operation and configuration to the hardware of a system, which at a minimum drives the input devices (e.g. keyboard) and provides primitive output, often to a display. The BIOS is usually written in Assembly language native to the processor.

BIOS is sometimes referred to as "firmware" because it is an integral part of the system hardware. The BIOS may occasionally be held on Read Only Memory (ROM) chips that could not be altered. Alternatively, the BIOS may be stored on Electronically Erasable Programmable ROM (EEPROM) or flash memory devices that can be easily upgraded by the user. However, most BIOSes have a "boot block" which is a portion of the ROM which runs first and is not updateable. Hardware manufacturers frequently issue BIOS updates to upgrade their products and remove bugs.

Typically the hardware configuration details of the device are embedded within the BIOS. It is possible to discover the macrocode and other intellectual property about the device and the device's components by disassembling the BIOS. A need therefore exists, to update and manage features available as part of a BIOS in a more secure fashion.

BRIEF DESCRIPTION OF THE DRAWINGS

Subject matter is particularly pointed out and distinctly claimed in the concluding portions of the specification. The claimed subject matter, however, both as to organization and the method of operation, together with objects, features and advantages thereof, may be best understood by a reference to the following detailed description when read with the accompanying drawings in which:

DETAILED DESCRIPTION

In the following detailed description, numerous details are set forth in order to provide a thorough understanding of the present claimed subject matter. However, it will be understood by those skilled in the art that the claimed subject matter may be practiced without these specific details. In other instances, well-known methods, procedures, components, and circuits have not been described in detail so as to not obscure the claimed subject matter.

In this context, the term BIOS also includes a hardware system that may, in one embodiment, be substantially compliant with those defined in the Extensible Firmware Interface (EFI) specification. *Extensible Firmware Interface (EFI) Specification*, ver 1.02, Dec. 12, 2000, Intel Corp. or specifications derivative thereof (hereafter, "the EFI specification").

Figure 1:
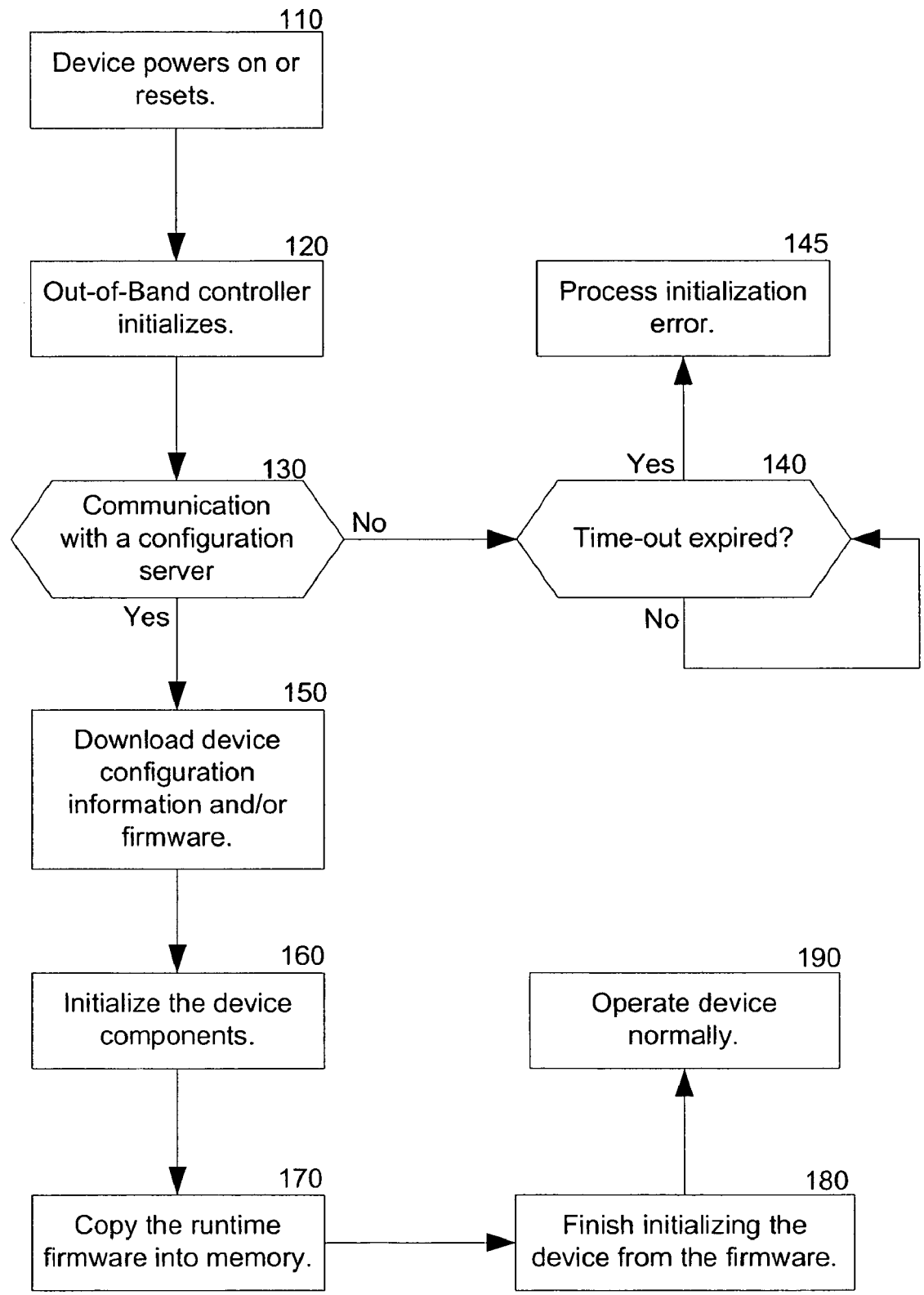
FIG. 1 is a flow chart illustrating an embodiment of a technique for attempting to initialize and configure a device utilizing a remote server.

FIG. 1 is a flow chart illustrating an embodiment of a technique for attempting to initialize and configure a device utilizing a remote server or configuration server. Block 110 illustrates that, in one embodiment, a device may be powered on or other wise playing in a reset state. In one embodiment, the device may attempt to perform the illustrated technique whenever the device is reset, only when placed in a certain type of reset state, or, in another embodiment, only when powered on.

Block 120 illustrates that, in one embodiment, a portion of the device called an out-of-band (OOB) controller may initialize. In this context, the term "out-of-band" refers to any communication of information via a dedicated channel, separate from that normally used for the transmission of information. In one embodiment, this out-of-band communication may include a secure protocol or network. In one specific embodiment, the secure protocol may include a protocol substantially compliant with the Transport Layer Security (TLS) protocol, or specifications derivative thereof. *The Transport Layer Security Protocol*, ver 1.0, January 1999, The Internet Society. (hereafter, "TLS" or "the TLS specification"). The OOB controller may be capable of communicating via an OOB network or channel.

In one embodiment, the out-of-band controller may initialize independently, or semi-independently of the rest of the device. In one embodiment, the OOB controller may include firmware that facilitates the initialization of the device. In one embodiment this firmware may be capable of being altered remotely. In one embodiment, this alteration may occur via the OOB controller itself.

Block 130 illustrates that, in one embodiment, the OOB controller may attempt to communicate with a configuration server (a.k.a. a remote server). In one embodiment, a remote server may be used to store low level device configuration information. It is understood that while the term "a remote server" is used throughout this document, in various embodiments a plurality of servers may be used and that the servers may be physically remote from the configured device or merely virtually remote; however, the term "a remote server" will be used throughout as a short hand phrase.

In one embodiment, the low level device configuration information may include the computer interface code that, among other tasks, locates and loads the operating system into memory and provides low-level communication, operation and configuration to the hardware of a system, which at a minimum drives the input devices (e.g. keyboard) and provides primitive output, often to a display. In one embodiment, the low level configuration information may include a traditional BIOS or EFI code.

In one embodiment, the remote server may house configuration information for various devices or groups of devices. It is contemplated that, in one embodiment, the remote server may be able to determine which configuration information is appropriate from a requesting device or what information is appropriate given a policy scheme. In another embodiment, the configuration information may be selectable by a user or other agent.

Block 140 illustrates that, in one embodiment, the device may not be able to communicate with the remote server. In this example, a time-out mechanism is illustrated but it is understood that other schemes may be used.

Block 145 illustrates that, in one embodiment, if the device is unable to communicate with the remote server an initialization error may be generated and dealt with. It is understood that various techniques for dealing with an initialization error are contemplated and within the scope of the disclosed subject matter. In one embodiment, the device may include a fail-safe BIOS, or equivalent, that may be used it the BIOS or other configuration information stored on the remote server can not be retrieved. In one embodiment, this may be the most recently used BIOS. However, other embodiments are within the scope of the disclosed subject matter.

Block 150 illustrates that, in one embodiment, the device or OOB controller may download the device configuration information from the remote server. In one embodiment, only a portion of the device configuration information may be downloaded. It is contemplated that embodiments may exist in which a first portion of the configuration information for the device is stored locally to the device and a second portion is stored on the remote server. In one embodiment, logical or control information may be stored locally and pure data may be stored remotely. In another embodiment, information that is sensitive, in an intellectual property sense, may be stored remotely and less sensitive information stored locally. Of course, these are merely a few non-limiting examples.

Block 160 illustrates that, in one embodiment, the components of the device may be initialized. In one embodiment, it is contemplated that the configuration information may be downloaded and executed as a traditional BIOS or EFI image. In another embodiment, it is contemplated that the configuration information may be downloaded is sections, for example, per component and executed individually in various ways.

In one specific illustrative embodiment, to which the disclosed subject matter is not limited, the device may include a chipset. The configuration information for this chipset may be downloaded and remotely programmed into the chipset via a System Management Bus (SMBus). In one embodiment, the device may include a component, such as, for example a processor, with an interface that is substantially compliant with the IEEE 1149.1 specification (a.k.a. JTAG interface). These components may be initialized via this JTAG interface. In yet another embodiment, the device may include a memory that includes a Serial Presence Detect (SPD) EEPROM that may be read or written to as part of the initialization process. It is understood that various embodiments of the device may include all, some, or none of these illustrative examples.

Block 170 illustrates that, in one embodiment, a runtime firmware may be copied into the device's memory. In one embodiment, this runtime firmware may have been downloaded as part of the configuration information.

Block 180 illustrates that, in one embodiment, the initialization of the device may be concluded from the runtime firmware. In one embodiment, this may include locating, loading, and executing an operating system for the device.

In one specific embodiment, this may include locating, downloading, and executing an operating system using a technique substantially complaint with the Preboot Execution Environment (PXE) specification. *Preboot Execution Environment (PXE) Specification*, ver 2.1, Sep. 20, 1999, Intel Corp. or specifications derivative, thereof (hereafter, "the PXE specification").

The Preboot Execution Environment (PXE) is an industry standard client/server interface that allows networked computers that are not yet loaded with an operating system to be configured and booted remotely by an administrator. The PXE code is typically delivered with a new computer on a read-only memory chip or boot disk that allows the computer (a client) to communicate with the network server so that the client machine can be remotely configured and its operating system can be remotely booted. However, it is contemplated that in one embodiment, the PXE may be downloaded from the configuration server via the out-of-band network as part of the downloaded device configuration information.

Since the PXE provides for the downloading of the operating system of a device after the device has been initialized, it is contemplated that in one embodiment the disclosed subject matter and the PXE specification (or functional equivalent) may be combined, in one embodiment, to remotely provide the device with both initialization information and an operating system. However, other techniques for retrieving an operating system are within the scope of the disclosed subject matter.

Block 190 illustrates that, in one embodiment, the device may be operated normally after the initialization process has occurred.

Figure 2:
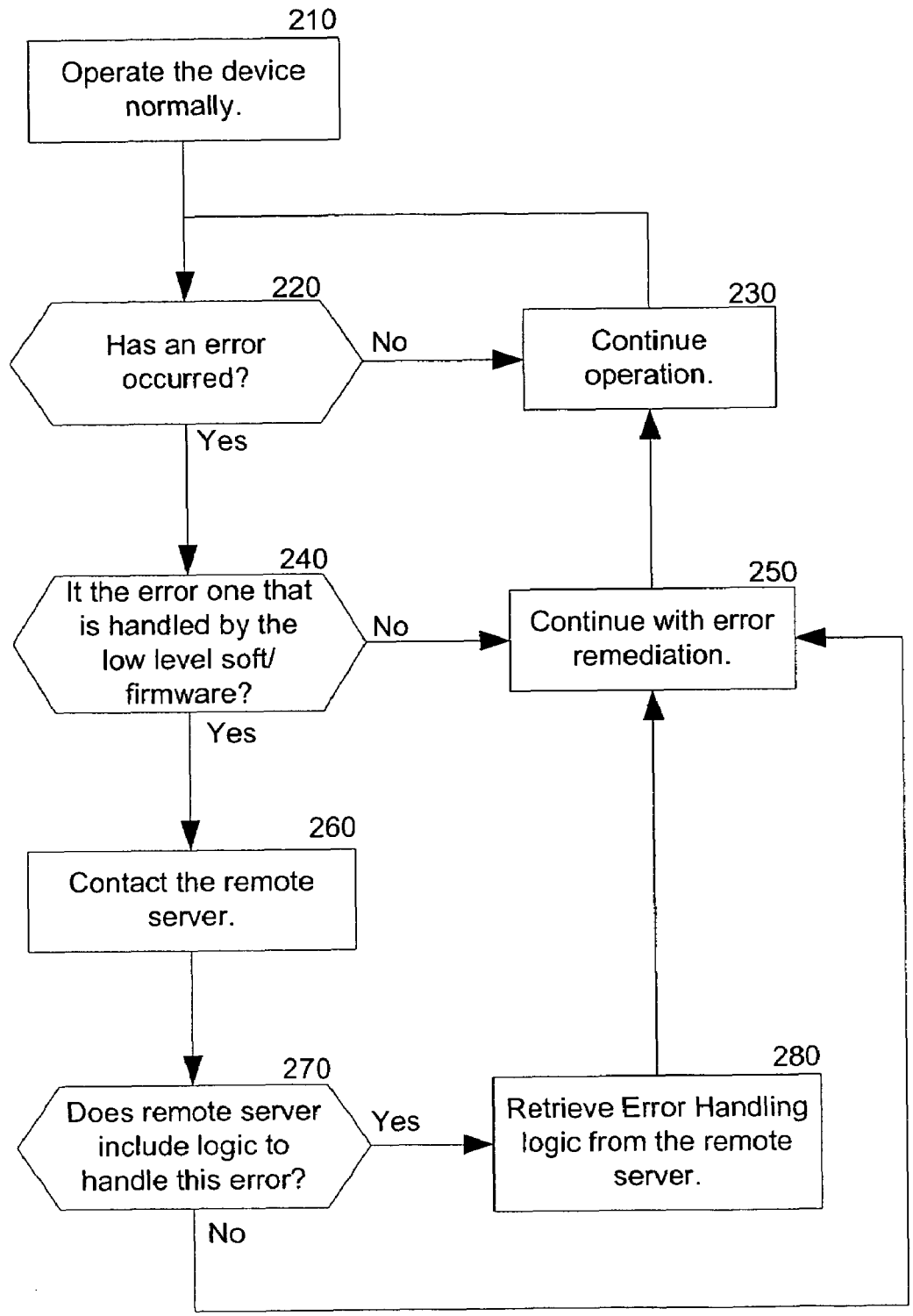
FIG. 2 is a flow chart illustrating an embodiment of a technique for attempting to initialize and configure a device utilizing a remote server.

FIG. 2 is a flow chart illustrating an embodiment of a technique for attempting to initialize and configure a device utilizing a remote server. Block 210 illustrates that the device may be operating normally, post entering the runtime phase of operation, as illustrated by Block 190 of FIG. 1.

Block 220 of FIG. 2 illustrates that, in one embodiment, an error may occur on the device. Block 230 illustrates that if no error occurs, normal operation may continue.

Block 240 illustrates that, in one embodiment, a determination may be made whether or not the error is a type that can be handled by low level firmware or software. In one embodiment, the error may be considered one handled by low level firmware or software whenever it would have been traditionally handled by BIOS or EFI code. In one specific embodiment, this may occur when either the device's BINIT# or BERR# signals are asserted. In one embodiment, this may be a determination as to whether or not to handle the error locally or via the remote configuration server described in reference to FIG. 1 above.

Block 250 illustrates that, in one embodiment, if the error is not one that is handled via the remote server, a local error remediation technique may be employed. In one embodiment, this may involve a local BIOS solution. It is contemplated that this BIOS may have previously been downloaded from the remote server. In another example, the error remediation may include a runtime phase software or other technique.

Block 260 illustrates that, in one embodiment, the remote server may be contacted. In one embodiment, this contact may include the out-of-band (OOB) controller or network.

Block 270 illustrates that, in one embodiment, a determination may be as to whether or not the remote server includes logic or information capable of handling this error. In one embodiment, the remote server may include a series of error handling techniques which it applies based upon a policy scheme. In another embodiment, the remote server may contain various error handling techniques based upon various supported device platforms. However, these are merely a few non-limiting examples of the disclosed subject matter.

Block 280 illustrates that, in one embodiment, if the remote server includes logic to handle this error, the error handling logic may be retrieved from the remote server. It is contemplated that, in one embodiment, the logic to handle the error may be stored in whole or part with the device and that remote server may merely instruct the device which portion of the logic to execute, or, in another embodiment, the remote server may provide the logic stored with the device with data to facilitate execution.

Block 250 illustrates that, in one embodiment, once the logic has been retrieved it may be executed on the device. In one embodiment, the error handling logic may be executed, in whole or part, on the remote server and the results sent to the device. Block 250, as a widely encompassing block, also illustrates that, in one embodiment, if the remote server does not contain logic to handle the error, that other techniques may be employed.

Figure 3:
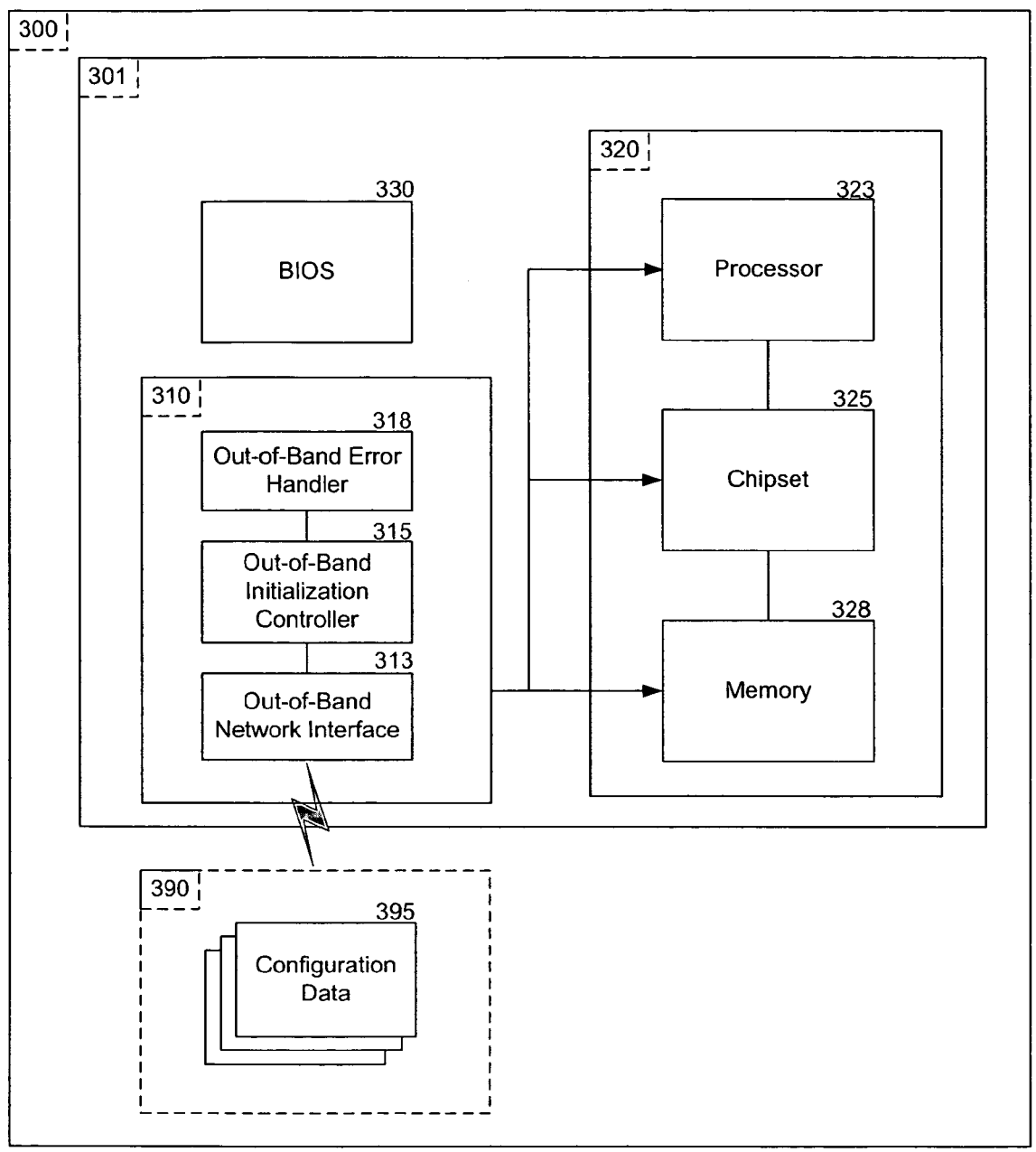
FIG. 3 is a block diagram illustrating an embodiment of an apparatus and system in accordance with the claimed subject matter.

FIG. 3 is a block diagram illustrating an embodiment of an apparatus 301 and system 300 in accordance with the claimed subject matter. In one embodiment, the system may include the apparatus and a configuration server 390 capable of storing low level device configuration data 395 and providing the data to the apparatus via an out-of-band (OOB) communication channel.

In one embodiment, the apparatus 301 may include an out-of-band (OOB) controller 310, and a number of hardware components 320. In one embodiment, the apparatus may also include a BIOS 330 or EFI component.

In one embodiment, the OOB controller 310 may be capable of communicating with the configuration server 390 via an out-of-band communication channel and facilitating the initialization of the apparatus by downloading low level configuration data from the configuration server. In one embodiment, the OOB controller may be capable of performing the techniques described above and illustrated in FIGS. 1 & 2.

In one embodiment the OOB controller 310 may include an OOB network interface 313, an OOB initialization controller 315, and an OOB error handler 318. The OOB network interface may be capable of sending and receiving data via an OOB network.

The OOB initialization controller 315 may be capable of, in one embodiment, facilitating the initialization of the apparatus by downloading low level configuration data from the configuration server. In one embodiment the OOB initialization controller may be capable of performing the technique described above and illustrated by FIG. 1.

The OOB initialization controller 315 may also be capable, in a specific illustrative embodiment, of initializing various components of the apparatus. In one specific illustrative embodiment, to which the disclosed subject matter is not limited, the hardware components 320 may include a chipset 325. The configuration information for this chipset may be downloaded and remotely programmed into the chipset via a System Management Bus (SMBus). In one embodiment, the hardware components 320 may include a component, such as, for example a processor 323, with an interface that is substantially compliant with the IEEE 1149.1 specification (a.k.a. JTAG interface). These components may be initialized via this JTAG interface. In yet another embodiment, the hardware components 320 may include a memory 328 that includes a Serial Presence Detect (SPD) EEPROM that may be read or written to as part of the initialization process. It is understood that various embodiments of the hardware components 320 may include all, some, or none of these illustrative examples.

The OOB error handler 318 may be capable of, in one embodiment, facilitating the handling of errors by downloading low level configuration data from the configuration server. In one embodiment the OOB error handler may be capable of performing the technique described above and illustrated by FIG. 2.

In one embodiment, the apparatus 301 may include a BIOS 330. In one embodiment, this BIOS may include a substantially compliant EFI firmware. In one embodiment, the contents of the BIOS may be downloaded from the configuration server 390 via the OOB network. In another embodiment, the BIOS may be a fail-safe BIOS that facilitates the initialization of the apparatus if the initialization can not be accomplished by the configuration server and OOB controller. In yet another embodiment, the BIOS may facilitate the initialization of the apparatus with the aid of the configuration server and OOB controller.

The techniques described herein are not limited to any particular hardware or software configuration; they may find applicability in any computing or processing environment. The techniques may be implemented in hardware, software, firmware or a combination thereof. The techniques may be implemented in programs executing on programmable machines such as mobile or stationary computers, personal digital assistants, and similar devices that each include a processor, a storage medium readable or accessible by the processor (including volatile and non-volatile memory and/or storage elements), at least one input device, and one or more output devices. Program code is applied to the data entered using the input device to perform the functions described and to generate output information. The output information may be applied to one or more output devices.

Each program may be implemented in a high level procedural or object oriented programming language to communicate with a processing system. However, programs may be implemented in assembly or machine language, if desired. In any case, the language may be compiled or interpreted.

Each such program may be stored on a storage medium or device, e.g. compact disk read only memory (CD-ROM), digital versatile disk (DVD), hard disk, firmware, non-volatile memory, magnetic disk or similar medium or device, that is readable by a general or special purpose programmable machine for configuring and operating the machine when the storage medium or device is read by the computer to perform the procedures described herein. The system may also be considered to be implemented as a machine-readable or accessible storage medium, configured with a program, where the storage medium so configured causes a machine to operate in a specific manner. Other embodiments are within the scope of the following claims.

While certain features of the claimed subject matter have been illustrated and described herein, many modifications, substitutions, changes, and equivalents will now occur to those skilled in the art. It is, therefore, to be understood that the appended claims are intended to cover all such modifications and changes that fall within the true spirit of the claimed subject matter.

The following is claimed:

1. A method comprising:

initializing an out-of-band (OOB) controller, the OOB controller in communication with a remote server and a device, wherein initializing the OOB controller is performed using a secure protocol and information about the device, the OOB controller:

retrieving at least a portion of a low level device configuration information for the device from the remote server;

configuring the device utilizing the low level device configuration information;

initializing the device;

booting an operating system on the device;

detecting that an error has occurred;

determining that the error is of a type that can be handled by firmware;

determining that the error that can be handled by firmware is to be handled via the remote server instead of being handled locally on the device, the determination based upon at least one of an existence of logic to handle the error on the remote server, a policy scheme associated with the error, and whether the remote server supports the device's platform;

determining that the logic to handle the error is already stored locally on the device and retrieving from the remote server at least one of data and instructions for sending to the device to facilitate local execution on the device of the logic to repair the error; and determining that the logic to handle the error is not stored locally on the device and either:

retrieving the logic from the remote server for storing on the device prior to the remote server sending at least one of data and instructions to the device to facilitate local execution on the device of the logic to repair the error, or initiating remote execution on the remote server of at least a portion of the logic to repair the device, and sending results of the remote execution to the device.

2. The method of claim 1, wherein retrieving at least a portion of the low level device configuration information from the remote server includes:

communicating with the remote server via the out-of-band controller.

3. The method of claim 2, wherein communicating with the remote server includes:

if communicating with the remote server is not successful, configuring the device utilizing a fail-safe set of low level device configuration information.

4. The method of claim 1, wherein the low level device configuration information includes a Basic Input-Output System (BIOS) firmware.

5. The method of claim 4, wherein the device includes a memory; and initializing the device includes copying a runtime portion of the firmware in the memory.

6. The method of claim 4, wherein the firmware includes a firmware substantially compliant with an Extensible Firmware Interface (EFI) specification.

7. The method of claim 1, wherein the device includes, at least one of, a chipset, a processor, or a memory; and configuring the device includes, respectively:

configuring the chipset via a system management bus (SMBus), configuring the processor via a JTAG interface, and configuring the memory via a serial presence detect EEPROM.

8. The method of claim 1, wherein retrieving at least a portion of the low level device configuration information includes:

selecting a set of low level device configuration information from among a plurality of sets of information based, at least in part, upon information about the device.

9. The method of claim 1, wherein booting the operating system includes:

contacting a remote operating system server;

downloading the operating system from the remote operating system server; and booting the operating system.

10. An article comprising:

a machine accessible medium having a plurality of machine accessible instructions, wherein when the instructions are executed, the instructions provide for:

initializing an out-of-band (OOB) controller, the OOB controller in communication with a remote server and a device, wherein initializing the OOB controller is performed using a secure protocol and information about the device;

retrieving at least a portion of a low level device configuration information for the device from the remote server;

configuring the device utilizing the low level device configuration information;

initializing the device;

booting an operating system on the device;

detecting that an error has occurred;

determining that the error is of a type that can be handled by firmware;

determining that the error that can be handled by firmware is to be handled via the remote server instead of being handled locally on the device, the determination based upon at least one of an existence of logic to handle the error on the remote server, a policy scheme associated with the error, and whether the remote server supports the device's platform;

determining that the logic to handle the error is already stored locally on the device and retrieving from the remote server at least one of data and instructions for sending to the device to facilitate local execution on the device of the logic to repair the error; and determining that the logic to handle the error is not stored locally on the device and either:

retrieving the logic from the remote server for storing on the device prior to the remote server sending at least one of data and instructions to the device to facilitate local execution on the device of the logic to repair the error, or initiating remote execution on the remote server of at least a portion of the logic to repair the device, and sending results of the remote execution to the device.

11. An apparatus comprising:

a plurality of hardware components; and an out-of-band controller having an out-of-band initialization controller for:

initializing communication with a remote server using a secure protocol and information about at least one of the plurality of hardware components;

retrieving at least a portion of a low level device configuration information from the remote server;

configuring the plurality of hardware components utilizing the low level device configuration information;

initializing the plurality of hardware components the out-of-band controller further having an out-of-band error handler for:

detecting that an error has occurred;

determining that the error is of a type that can be handled by firmware;

contacting, via an out-of-band network, an error handling server that is expected to include an error handling logic to handle the error;

determining that the error that is of the type that can be handled by firmware is to be handled via the error handling server instead of being handled locally on the plurality of hardware components, the determination based upon at least one of an existence of the error handling logic on the error handling server, a policy scheme associated with the error, and whether the error handling server supports the platform of the plurality of hardware components;

determining that the error handling logic is already stored locally on the plurality of hardware components and retrieving from the error handling server at least one of data and instructions for sending to the plurality of hardware components to facilitate local execution on the plurality of hardware components of the error handling logic to repair the error; and determining that the error handling logic is not stored locally on the plurality of hardware components and either:

retrieving the error handling logic from the error handling server for storing on the plurality of hardware components prior to the error handling server sending at least one of data and instructions to the plurality of hardware components to facilitate local execution on the plurality of hardware components of the error handling logic to repair the error, or initiating remote execution on the error handling server of at least a portion of the error handling logic to repair the plurality of hardware components, and sending results of the remote execution to the plurality of hardware components.

12. The apparatus of claim 11, wherein retrieving at least a portion of the low level device configuration information from the remote server includes:

communicating with the remote server via the out-of-band controller.

13. The apparatus of claim 12, further including a fail-safe set of low level device configuration information; and wherein communicating with the remote server includes:
if communicating is not successful, configuring the device utilizing a fail-safe set of low level device configuration information.

14. The apparatus of claim 11, wherein the low level device configuration information includes a Basic Input-Output System (BIOS) firmware.

15. The apparatus of claim 14, wherein the plurality of hardware components includes a memory; and initializing the plurality of hardware components includes copying the runtime portion of the firmware into the memory.

16. The apparatus of claim 14, wherein the firmware includes a firmware substantially compliant with an Extensible Firmware Interface (EFI) specification.

17. The apparatus of claim 11, wherein the plurality of hardware components includes, at least one of, a chipset, a processor, or a memory; and configuring the plurality of hardware components includes, respectively:
configuring the chipset via a system management bus (SMBus),
configuring the processor via a JTAG interface, and
configuring the memory via a serial presence detect EEPROM.

18. The apparatus of claim 11, wherein retrieving at least a portion of the low level device configuration information includes:

selecting a set of low level device configuration information from among a plurality of sets of information based, at least in part, upon information about the plurality of hardware components.

19. An apparatus of claim 11, wherein retrieving the error handling logic from the error handling server includes:

retrieving the error handling logic via the out-of-band network; and retrieving a set of instructions from the error handling server that provide for recovering from the error.

20. The apparatus of claim 11 wherein the out-of-band controller includes:

an out-of-band network interface capable of communicating via the out-of-band network.

21. A system comprising:

a configuration server capable of storing low level device configuration information; and a device including:
a plurality of hardware components; and
an out-of-band controller capable of:
establishing communication with the configuration server using a secure protocol and information about the device;
retrieving at least a portion of the low level device configuration information from the configuration server;
configuring the plurality of hardware components utilizing the low level device configuration information,
initializing the plurality of hardware components,
detecting that an error has occurred;
determining that the error is a type that can be handled by firmware;
contacting, via an out-of-band network, an error handling server that is expected to include logic to handle the error;
determining that the error that is the type that can be handled by firmware is to be handled via the error handling server instead of being handled locally on the plurality of hardware components, the determination based upon at least one of an existence of the error handling logic on the error handling server, a policy scheme associated with the error, and whether the error handling server supports the platform of the plurality of hardware components;
determining that the error handling logic is already stored locally on the plurality of hardware components and retrieving from the error handling server at least one of data and instructions for sending to the plurality of hardware components to facilitate local execution on the plurality of hardware components of the error handling logic to repair the error; and
determining that the error handling logic is not stored locally on the plurality of hardware components and either:
retrieving the error handling logic from the error handling server for storing on the plurality of hardware components prior to the error handling server sending at least one of data and instructions to the plurality of hardware components to facilitate local execution on the plurality of hardware components of the error handling logic to repair the error, or
initiating remote execution on the error handling server of at least a portion of the error handling logic to repair the plurality of hardware components, and sending results of the remote execution to the plurality of hardware components.

22. The system of claim 21, wherein the configuration server includes the error handling server.

* * * * *